United States Patent [19]  
Uchiyama et al.

[11] Patent Number: 4,902,584  
[45] Date of Patent: Feb. 20, 1990

[54] OPTICAL RECORDING MEDIUM
[75] Inventors: Kenji Uchiyama; Hideki Ishizaki; Hajime Utsunomiya; Suguru Takayama, all of Nagano, Japan
[73] Assignee: TDK Corporation, Tokyo, Japan
[21] Appl. No.: 136,971
[22] Filed: Dec. 23, 1987
[30] Foreign Application Priority Data
 Dec. 25, 1986 [JP] Japan ................. 61-314948
 Dec. 26, 1986 [JP] Japan ................. 61-313720
 Jun. 19, 1987 [JP] Japan ................. 62-153028
[51] Int. Cl.⁴ .............. G11B 5/66; G11B 3/70; B32B 9/00
[52] U.S. Cl. .................. 428/694; 428/900; 428/469; 369/286
[58] Field of Search ........... 428/694, 900, 469, 472; 360/131–135; 365/122; 369/13, 288, 286

[56] References Cited
U.S. PATENT DOCUMENTS 4,645,722 2/1987 Katayama et al. ............. 428/694
4,658,388 4/1987 Ishiwatari et al. ............. 430/945
4,661,420 4/1987 Nakamura et al. ............. 428/900
4,680,742 7/1987 Yamada et al. ............. 369/13
4,743,502 5/1988 Yoshitomi et al. ............. 428/900

FOREIGN PATENT DOCUMENTS 163810 11/1985 European Pat. Off. .
2558003 7/1985 France .
2143689 2/1985 United Kingdom .

Primary Examiner—George F. Lesmes
Assistant Examiner—Dennis V. Carmen
Attorney, Agent, or Firm—Oblon, Spivak, McClelland, Maier & Neustadt

[57] ABSTRACT

An optical recording medium comprising a recording layer on a substrate and a protective layer formed adjacent to the upper or lower surface of the recording layer is more durable and corrosion resistant when the protective layer has a composition comprising silicon, a divalent metal such as Ba, Ca or Sr, oxygen, and nitrogen. An intermediate layer containing silicon, a metal or metalloid such as aluminum or lanthanum, oxygen and nitrogen is formed between the protective layer and the recording layer.

11 Claims, 1 Drawing Sheet

OPTICAL RECORDING MEDIUM

BACKGROUND OF THE INVENTION

1. Field of the Invention

This invention relates to magneto-optical recording media.

2. Discussion of the Background

For optical recording media of magneto-optical memory type, there are well known a number of materials for a recording layer thereof, for example, MnBi, MnAlGe, MnSb, MnCuBi, GdFe, TbFe, GdCo, PtCo, TbCo, TbFeCo, GdFeCo, $TbFeO_3$, GdIG (gadolinium iron garnet), GdTbFe, GdTbFeCoBi, $CoFe_2O_4$, etc. These materials are deposited on transparent substrates of plastic material or glass as a thin film by any suitable thin-film forming techniques such as vacuum deposition or sputtering. The features common to these magneto-optical recording thin film layers are that the axis of easy magnetization is perpendicular to the film surface and that Kerr and Farady effects are great.

Requirements imposed on such magneto-optical recording media are:

(1) that the Curie point is of the order of 100° to 200° C. and the compensation point is close to room temperature,
(2) that noise-inducing defects such as grain boundaries are relatively fewer, and
(3) that a magnetically and mechanically uniform film is obtained over a relatively large area.

In the light of these requirements, a great attention is recently drawn to amorphous perpendicular magnetizable thin films of rare earth element-transition metal among the above-mentioned materials. Magneto-optical recording media having such amorphous perpendicular magnetizable thin films of rare earth element-transition metal, however, have a storage problem. If the magnetic thin film layers are stored in contact with the ambient atmosphere, rare earth elements therein are preferentially erroded or oxidized by oxygen and moisture in the atmosphere, losing the necessary information recording and reproducing ability.

For this reason, most investigations are generally directed to those recording media of the construction having a protective layer disposed on a surface of a magnetic thin film layer adjacent to or remote from the substrate. Known protective layers are vacuum deposited films of inorganic materials such as silicon monoxide, silicon dioxide, aluminum nitride, silicon nitride and zinc sulfide as well as resinous coatings (see Japanese Patent Application Kokai No. 58-80142). However, these protective layers are insufficient in moisture protection or adhesion to the substrate.

A protective layer of an inorganic glass based composition is also known as achieving some improvements in durability of the medium, particularly prevention of moisture penetration and adhesion improvement. Japanese patent application Kokai No. 59-162621 discloses a glass layer vacuum deposited on a plastic substrate, the glass comprising 80 to 90% by weight of $SiO_2$, 5 to 15% by weight of $B_2O_3$, 1 to 10% by weight of $Al_2O_3$, and 1 to 10% by weight of $Na_2O$. Japanese patent application Kokai No. 60-177449 discloses a thin film layer of inorganic glass interposed between a substrate and a recording layer. The glass is typically an alkali-free glass composition commercially available from Corning Glass as Code No. 7059 having the composition of 49.9% $SiO_2$, 10.5% $B_2O_3$, 4.3% CaO, 25.1% BaO, and 10.3% $Al_2O_3$.

Japanese patent application Kokai No. 60-145525 discloses a protective layer comprising a mixture of $Si_3N_4$ and $SiO_2$.

These approaches, however, do not fully meet the strict requirements of durability and corrosion resistance on magneto-optical recording media. There is a need for a magneto-optical recording medium having more improved properties.

The same problem arises in a magneto-optical recording medium having a recording layer of the so-called phase conversion type.

SUMMARY OF THE INVENTION

One object of the present invention is to provide a novel and improved magneto-optical recording medium having improved durability and corrosion resistance.

Another object of the present invention is to provide a novel and improved magneto-optical recording medium having a recording layer which is unlikely to deteriorate.

A further object is to provide an magneto-optical recording medium of the type wherein information is recorded and reproduced with the use of heat and light of a laser beam.

The present invention is directed to an magneto-optical recording medium comprising a substrate, a recording layer on the substrate having upper and lower surfaces remote from and adjacent to the substrate, and a protective layer formed on the upper and/or lower surface of the recording layer with or without an intermediate layer.

According to the feature of the present invention, the protective layer comprises a silicon species, at least one divalent metal species, and an oxygen species and a nitrogen species. The term "species" is used to encompass any states of an element including elemental and ionic states although these elements are present as compounds, especially as oxides and nitrides as will be described later.

The divalent metal species is preferably selected from the group consisting of barium, calcium, magnesium, zinc, lead, strontium elements and ions, and mixtures thereof.

In another embodiment, the protective layer further contains an aluminum and/or boron species.

In a further embodiment, the protective layer further contains at least one rare earth element species.

Best results are obtained with two protective layers wherein one protective layer is disposed adjacent to the upper surface of the recording layer and the other protective layer is disposed adjacent to the lower surface of the recording layer.

In one preferred embodiment, the medium further comprises an intermediate layer disposed contiguous to the lower surface of the recording layer, the intermediate layer comprising a silicon species, at least one metal or metalloid species, an oxygen species, and a nitrogen species. The metal or metalloid species in the intermediate layer is a rare earth element species or an aluminum species.

BRIEF DESCRIPTION OF THE DRAWINGS

The above and other objects, features, and advantages of the present invention will be more readily understood from the following description when taken in conjunction with the accompanying drawings, in which.

DETAILED DESCRIPTION OF THE INVENTION

Figure 1:
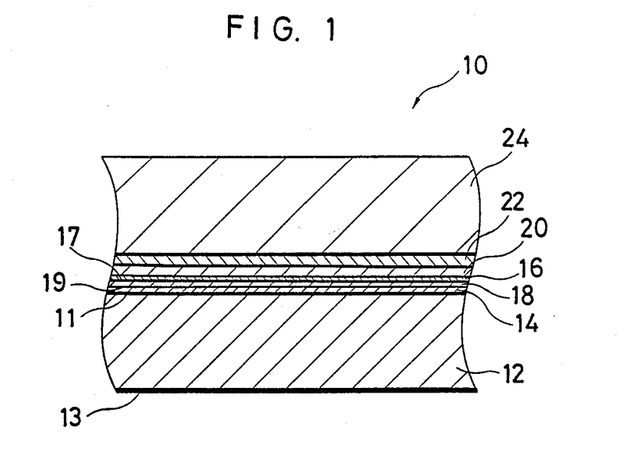
FIG. 1 is a cross-sectional view of a magneto-optical recording medium according to one embodiment of the present invention.
Figure 2:
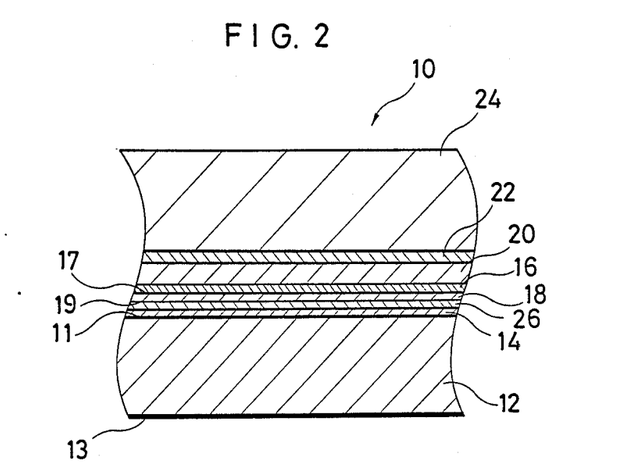
FIG. 2 is a cross-sectional view of a magneto-optical recording medium according to another embodiment of the present invention.

Two preferred embodiments of the magneto-optical recording medium of the present invention are illustrated in FIGS. 1 and 2. They have substantially the same structure except for the presence of an intermediate layer in FIG. 2. Like reference numerals designate identical or corresponding parts throughout the figures. For brevity of description, the terms "upper" and "lower" are used in a normal sense as viewed in FIGS. 1 and 2.

The magneto-optical recording medium according to the present invention is generally designated at 10 as comprising a substrate 12 having a pair of opposed major surfaces 11, 13 and a recording layer in the form of a magnetic thin-film layer 18 on the upper surface 11 of the substrate. The magnetic thin-film layer 18 has a pair of opposed major surfaces, that is, an upper surface 17 disposed remote from the substrate 12 and a lower surface 19 disposed adjacent to the substrate 12. The medium further includes protective layers 14 and 16 of amorphous material disposed adjacent to the lower and upper surfaces 19 and 17 of the magnetic thin-film layer 18, respectively. As seen from the figure, the lower protective layer 14 is disposed between the substrate 12 and the magnetic thin-film layer 18, and the upper protective layer 16 is disposed on the upper surface 17 of the magnetic thin-film layer 18.

Although two protective layers 14 and 16 are illustrated in FIGS. 1 and 2, the present invention only requires the provision of at least one of the protective layers. In order to completely protect the magnetic thin-film layer 18, it is desired to form a protective layer on either surface of the magnetic thin-film layer as illustrated in the figure.

Each of the protective layers 14 and 16 has a composition comprising a silicon species and at least one divalent metal species as a metal and metalloid component, and an oxygen species and a nitrogen species. Inclusion of these elements provides the medium with excellent durability and corrosion resistance. The effectiveness of the present invention is lost even when one of these elements is lacking.

The divalent metal represented by M(II) used herein includes at least one element selected from barium (Ba), calcium (Ca), magnesium (Mg), zinc (Zn), lead (Pb), and strontium (Sr). Preferred divalent metals are Ba, Ca, Sr and mixtures of two or three of them. When more than one divalent metal is used, their relative proportion is not critical.

The silicon and divalent metal are present in the protective layer such that the atomic ratio of silicon to the total of metal and metalloid component, that is, $Si/(Si+M(II))$ in this embodiment may fall within the range of from about 3:10 to about 9:10, preferably from about 3:10 to about 8:10. A ratio $Si/(Si+M(II))$ of less than 3/10 is detrimental to corrosion resistance whereas a ratio of more than 9/10 is detrimental to stability.

The oxygen and nitrogen are present in the protective layer such that the atomic ratio of oxygen to the total of oxygen and nitrogen, that is, $O/(O+N)$ may fall within the range of from about 4:10 to about 8:10, preferably from about 5:10 to about 8:10. A ratio of $O/(O+N)$ of less than 4/10 is detrimental to corrosion resistance whereas a ratio of more than 8/10 is deterimental to electromagnetic properties and durability.

In a preferred embodiment of the present invention, the protective layer may further contain an aluminum and/or boron species as the metal and metalloid component. Inclusion of aluminum or boron or a mixture of aluminum and boron further improves corrosion resistance.

The aluminum and/or boron is present in the protective layer such that the atomic ratio of aluminum or boron to silicon, $(Al+B)/Si$ may be up to 1:1, preferably in the range of from 1:10 to 1:1, more preferably in the range of from 3:10 to 1:1. A ratio $(Al+B)/Si$ of more than 1/1 is detrimental to corrosion resistance, durability and film evenness. The addition of Al and/or B in a ratio $(Al+B)/Si$ of less than 1/10 is ineffective for its purpose. When a mixture of aluminum and boron is contained, their relative proportion is not critical. The atomic ratio of silicon to the total of metal and metalloid component falls within the same range as described above, that is, $Si/(Si+M(II)+Al+B)$ in this embodiment ranges from about 3:10 to about 9:10, preferably from abaout 3:10 to about 8:10.

In the practice of the present invention, the above-mentioned species are present in the protective layer in the following forms. Silicon is present as a silicon oxide, typically $SiO_2$ and sometimes $SiO$ and a nitride, typically $Si_3N_4$. The divalent metal M(II) is present as a divalent metal oxide M(II)O, typically BaO, CaO, MgO, ZnO, PbO and SrO. The aluminum and boron are present as oxides, typically $Al_2O_3$ and $B_2O_3$ and nitrides, typically AlN and BN. Stoichiometrically stated, the protective layer comprises $SiO_2$, $Si_3N_4$, M(II)O and an optional member selected from the group consisting of $Al_2O_3$, $B_2O_3$, AlN, BN, and mixtures thereof. These compounds may have a composition deviating from their stoichiometry when they are present in the protective layer. These compounds form a vitreous material as a whole.

In the protective layer, the silicon oxide and silicon nitride are present such that the molar ratio of silicon oxide (calculated as $SiO_2$) to silicon nitride (calculated as $Si_3N_4$) ranges from about 50:50 to about 90:10.

When the protective layer further contains aluminum, boron or a mixture of aluminum and boron, the molar ratio of the total of the oxides of Si, Al and B (calculated as $SiO_2$, $Al_2O_3$ and $B_2O_3$) to the total of the nitrides of Si, Al and B (calculated as $Si_3N_4$, AlN and BN) ranges from about 50:50 to about 90:10. Provided that the compounds are represented by their stoichiometric composition, the relative proportion of $Al_2O_3$ and $B_2O_3$ and the relative proportion of $Si_3N_4$ to AlN and BN are not critical.

In the practice of the present invention, the protective layer may further contain a monovalent metal species M(I), for example, Li, Na, K, Rb, Cs, and Fr, usually in the form of an oxide, for example, $Li_2O$, $Na_2O$, $K_2O$, $Rb_2O$, $Cs_2O$, and $Fr_2O$.

In the preferred embodiment, the protective layer contains at least one rare earth element species selected from the group consisting of yttrium species, lanthanide species and actinide species. Preferably, at least one species selected from yttrium and lanthanide species is contained in the amorphous material mentioned above. Inclusion of a rare earth element further improves recording sensitivity and C/N ratio.

Better results are obtained when the protective layer contains at least one rare earth element selected from the group consisting of yttrium (Y), lanthanum (La), cerium (Ce), praseodymium (Pr), neodium (Nd), promethium (Pn), samarium (Sm), and europium (Eu). Not only recording/reproducing performance including recording sensitivity and C/N ratio, but also durability and corrosion resistance are improved.

The rare earth element is present in the protective layer as a mixture with the vitreous or amorphous material in either an elemental form or a compound form. When the rare earth element is contained as a compound, it is usually present as an oxide.

In order to improve recording/reproducing performance as well as durability and corrosion resistance, the rare earth element is preferably contained in an elemental form or a partial oxide form. Then the rare earth element plays the role of an oxygen trap in the protective layer, contributing to improvements in corrosion resistance and durability.

The rare earth element is present in an amount of about 2 to about 250 atom %, preferably from about 2 to about 212 atom % based on the total of silicon, divalent metal, and optional aluminum and/or boron. The addition of less than about 2 atom % of rare earth element is ineffective for its purpose. More than 250 atom % will adversely affect C/N characteristics.

The rare earth element is preferably contained as an element or a partial oxide containing less than about 90% of oxygen based on the theoretical oxygen quantity derived from its stoichiometric oxide composition which is generally represented by $R_2O_3$ wherein R is a rare earth element, for example, $Y_2O_3$ and $La_2O_3$, with the exception of $CeO_2$ for Ce.

The protective layer is generally in amorphous form.

An elemental analysis of Si, Al, B, alkali metal, divalent metal, Y, lanthanide, actinide and other elements may be carried out by suitable spectroscopy including Auger, SIMS, ESCA, and LAMMA.

When the protective layers 14 and 16 are formed contiguous to the lower and upper surfaces of the magnetic thin-film layer 18 as illustrated in FIG. 1, these two protective layers may have the same composition or different compositions falling within the above-defined range according to the present invention. It is also within the scope of the present invention that one protective layer has a composition within the present invention and the other protective layer has a composition outside the present invention.

The protective layer may be formed by any desired one of gas phase film-forming techniques including sputtering, evaporation, ion plating, plasma chemical vapor deposition (CVD), and light CVD. Preferred techniques are multiple source sputtering using two or more targets of different compositions and reactive sputtering using oxygen and nitrogen. When the protective layer contains a rare earth element as defined above, sputtering is best suited. Particularly preferred is a double sputtering technique using a target of a vitreous material and another target of a rare earth element.

The thickness of the protective layer preferably ranges from about 300 to about 3,000 Å, more preferably from about 500 to about 2,000 Å irrespective of whether it is formed adjacent to the lower or upper surface of the magnetic thin-film layer. Weatherability is poor with a thickness of less than about 300 Å. A protective layer having a thickness of more than about 3,000 Å will adversely affect the sensitivity of the medium.

In another embodiment wherein the protective layer 14 is formed on the substrate 12 and an intermediate layer 26 (which will be described later) is formed on the protective layer 14 as illustrated in FIG. 2, it is desired that the protective layer 14 be about 300 to about 1,000 Å thick and the intermediate layer 26 be about 500 to about 1,500 Å thick.

The protective layer may contain some impurities. For example, it is permissible that argon is introduced from the film-forming atmosphere. The nitrogen introduced from the film-forming atmosphere can be present as $N_2$ in the protective layer. Other impurities will be introduced from the source materials. For example, $Fe_2O_3$, $CuO$, $Cr_2O_3$, $MnO_x$, $CoO$, $NiO$, $As_2O_3$ may be contained in an amount of less than about 1.0% by weight based on the total weight of the protective layer.

When two protective layers are provided, at least either of them, especially lower protective layer 14 must satisfy the above-described requirement. The other protective layer, especially upper protective layer 16 may be of a different composition. Preferred examples of the vitreous material of which the upper protective layer 16 is formed are disclosed in copending U.S. patent application Ser. No. 07/133,876 (filed Dec. 16, 1987). Of course, the upper protective layer 16 may have a composition falling in the range previously defined for the lower protective layer 14 and vice versa. In either case, the preparation and thickness of protective layers are as described above.

The magnetic thin-film layer 18 is a layer in which signals indicative of information are magnetically recorded using a modulated thermal beam or modulated magnetic field and the recorded signals are reproduced through magnetic-to-optical signal conversion.

The magnetic thin-film layer is generally formed from alloys containing rare earth elements and transition metals by conventional techniques such as sputtering and vacuum deposition to produce an amorphous film to an ordinary thickness. The rare earth elements and transition metals used include all the members of their chemically defined classes. The preferred rare earth elements are gadolinium (Gd) and terbium (Tb), and the preferred transition metals are iron (Fe) and cobalt (Co). The magnetic thin-film layer is preferably comprised of 65 to 85 atom percents of Fe and Co in total and the balance essentially of rare earth metal, especially Gd and/or Tb. Preferred combinations are TbFeCo, GdFeCo, GdTbFeCo, etc. The magnetic thin-film layer may contain less than about 10 atom % of Cr, Al Ti, Pt, Si, Mo, Mn, V, Ni, Cu, Zn, Ge, Au, etc. The magnetic thin-film layer may also contain less than about 10 atom % of an additional rare earth element such as Sc, Y, La, Ce, Pr, Nd, Pm, Sm, Eu, Dy, Ho, Er, Tm, Yb, Lu, etc.

The magnetic thin-film layers are preferably 100 to 10,000 Å thick.

The material of which the recording layer is made also includes materials of phase conversion type, for example, Te-Se, Te-Se-Sn, Te-Ge, Te-Tn, Te-Sn, Te-Ge-Sb-S, Te-Ge-As-Si, Te-Si, Te-Ge-Si-Sb, Te-Ge-Bi, Te-Ge-In-Ga, Te-Si-Bi-Tl, Te-Ge-Bi-In-S, Te-As-Ge-Sb, Te-Ge-Se-S, Te-Ge-Se, Te-As-Ge-Ga, Te-Ge- S-In, Se-Ge-Tl, Se-Te-As, Se-Ge-Tl-Sb, Se-Ge-Bi, Se-S (see Japanese Patent Publication No. 54-41902 and Japanese Patent No. 1004835), $TeO_x$ (Te dispersed in tellurium oxide as described in Japanese patent application Kokai No. 58-54338 and Japanese Patent No. 974257), $TeO_x + PbO_x$ (see Japanese Patent No. 974258), $TeO_x + VO_x$ (see Japanese Patent No. 974257), chalcogens, for example, Te and Se base materials such as Te-Tl, Te-Tl-Si, Se-Zn-Sb, Te-Se-Ga, and $TeN_x$, alloys capable of amorphous-crystal transformation such as Ge-Sn and Si-Sn, alloys capable of color change through crystal structure transformation such as Ag-Zn, Ag-Al-Cu, and Cu-Al, and alloys capable of grain size change such as In-Sb.

The recording layer may be formed by any desired dry coating technique including evaporation, sputtering, and ion plating. The recording layer generally has a thickness of from about 20 nm to about 1 μm.

The substrate 12 for use in the optical recording medium according to the present invention is generally formed of glass or a resinous material. Typical resins include acrylic resins, polycarbonate resins, epoxy resins, and olefinic resins such as polymethylpentene. Preferred among these resins are polycarbonate resins because of their durability, especially resistance to warpage.

The polycarbonate resins used herein may be aliphatic polycarbonates, aromatic-aliphatic polycarbonates and aromatic polycarbonates, with the aromatic polycarbonates being particularly preferred. Polycarbonates derived from bisphenols are preferred because of melting point, crystallinity and ease of handling. The most preferred is a bisphenol-A polycarbonate. The polycarbonate resin preferably has a number average molecular weight of from about 10,000 to 15,000.

The substrate 12 preferably has a refractive index of from about 1.55 to 1.59 at a wavelength of 830 nm. Since recording is generally carried out through the substrate, the transmittance of recording or reading-out light is preferably 86% or higher.

In general, the substrate is of disk shape although it may have another shape such as tape and drum. The substrate may be of normal dimesions.

The surface 11 of such a disk-shaped substrate 12 on which the magnetic thin-film layer 18 is formed may be provided with a tracking channel. The channel has a depth of about λ/8n, especially from λ/6n to λ/12n wherein n is the refractive index of the substrate. The channel has a width of about 0.4 to 2.0 μm. The substrate may also be formed with a pit for addressing purpose.

Those portions of the magnetic thin-film layer which are located on the bottom of the channels constitute recording tracks where writing and reading light beams are preferably directed from the lower surface of the substrate. With this construction, the reading C/N ratio is improved and a control signal of a greater magnitude is available for tracking.

The protective layer 16 or 14 according to the present invention may be formed adjacent to the upper and/or lower surface of the magnetic thin-film layer 18 with or without an intermediate layer. That is, an intermediate layer may be formed between the magnetic thin-film layer and the protective layer. Most preferably, an intermediate layer 26 is formed between the the magnetic thin-film layer 18 and the lower protective layer 14 which is contiguous to the substrate 12 as illustrated in FIG. 2.

The intermediate layer may be formed from a variety of dielectric materials, for example, compounds containing oxygen, carbon, nitrogen and sulfur, such as $SiO_2$, $SiO_x$, AlN, $Al_2O_3$, $Si_3N_4$, ZnS, BN, $TiO_2$, and TiN. Other useful inorganic and organic films may occur to those skilled in the art. These dielectric materials may be used alone or in admixture.

In one preferred embodiment of the present invention, the intermediate layer 26 which is formed contiguous to the lower surface 19 of the recording layer 18 contains a silicon species, at least one metal or metalloid species other than silicon, an oxygen species, and a nitrogen species. Silicon is generally present as oxides, typically SiO and $SiO_2$ and nitrides, typically $Si_3N_4$. These compounds can have a composition deviating from their stoichiometry. The metal or metalloid other than silicon is also present in the form of an oxide and/or nitride in the intermediate layer. The metals and metalloids are preferably selected from rare eath elements, Al, Ti, Zn and B. Most preferred elements are rare earth elements and Al.

(1) Intermediate Layer Containing A Rare Earth Element As An Essential Component The rare earth element used herein includes all the elements chemically classified as rare earth elements, that is, Sc, Y, La through Sm, and Eu through Lu. At least one rare earth element is contained in the intermediate layer. The rare earth element may be present as being bonded to oxygen and partially to nitrogen. Inclusion of lanthanum (La), cerium (Ce) or a mixture of La and Ce is preferred. The oxides of lanthanum and cerium are usually $La_2O_3$ and $CeO_2$. They usually take their stoichiometric composition, but may have a composition deviating therefrom. It suffices that either lanthanum oxide or cerium oxide or both lanthanum oxide and cerium oxide be present in the intermediate layer. When a mixture of lanthanum oxide and cerium oxide is present, their relative proportion is not critical.

In addition to a primary rare earth element oxide selected from lanthanum oxide or cerium oxide or a mixture of lanthanum oxide and cerium oxide, the intermediate layer composition may contain less than about 10 atom % of the oxide of a secondary rare earth element such as Y and Er, the atom % being calculated as metal and based on the primary rare earth element.

The intermediate layer composition may contain the oxides of other incidental elements such as Fe, Mg, Ca, Sr, Ba, and Al. For these incidental elements, Fe is present in an amount of less than about 10 atom % and the remaining elements are present in a total amount of less than about 10 atom %.

The intermediate layer 26 preferably contains a rare earth element compound and silicon compounds (oxide and nitride) such that the weight ratio of the total of rare earth element compound to the total of silicon compounds and rare earth element compound ranges from about 1:20 to about 1:2. Below this range, there are observable an output drop and a reduction of durability under high-temperature, high-humidity conditions. Beyond this range, there are observable a noise increase and a reduction of durability under high-temperature, high-humidity conditions.

In the intermediate layer, the atomic ratio of O/N preferably ranges from about 0.2:1 to about 3:1. The medium is less durable under high-temperature, high-humidity conditions when the intermediate layer has an O/N atomic ratio of less than 0.2. The medium produces an output drop and tends to deteriorate with time when the intermediate layer has an O/N atomic ratio of more than 3. It will be understood that determination of such an atomic ratio can be made by a suitable spectral analysis such as Auger spectroscopy and EDA.

The intermediate layer may have a graded concentration of oxygen and nitrogen in its thickness direction. It is preferred that the intermediate layer is oxygen rich on a side adjacent to the substrate and nitrogen rich on a side remote from the substrate. More specifically, the intermediate layer has an atomic ratio $(O/N)_1$ of from about 1.0 to about 100 near its lower surface adjacent to the substrate, and an atomic ratio $(O/N)_u$ of from about 0.1 to about 2.0 near its upper surface remote from the substrate, with the ratio of $(O/N)_1/(O/N)_u$ ranging from about 1 to about 100.

Another concentration gradient is also contemplated wherein both nitrogen and oxygen become rich on a side adjacent to the substrate.

(2) An Intermediate Layer Containing Aluminum As An Essential Component

Aluminum is generally present in its stoichiometric forms $Al_2O_3$ and $AlN$, but may have a composition deviating therefrom. Stoichiometrically stated, the intermediate layer contains $Al_2O_3$ and $AlN$ in addition to $SiO_2$, $SiO$, $Si_3N_4$ and the metal or metalloid oxide and nitride.

The proportion of oxide and nitride is such that the nitride is richer than the oxide, preferably the nitrogen quantity is about 1 to 20 times the oxygen quantity in atomic ratio. A nitride richer intermediate layer is more effective in maintaining the recording/reproducing performance of the recording layer stable and protecting the recording layer against corrosion. An oxide richer intermediate layer has the likelihood of output drop. A nitride too much richer intermediate layer is undesirable in view of strain.

The intermediate layer 26 may have a graded concentration of a predetermined element in a thickness direction. Preferably, the intermediate layer is made N and O rich on its side adjacent to the substrate. Alternatively, the intermediate layer may be made relatively O rich on its substrate side and relatively N rich on its recording layer side. Such a graded intermediate layer provides a recording medium which exhibits excellent recording/reproducing performance while minimizing deterioration with aging.

In a preferred embodiment wherein the metal and metalloid used are Al and Si, the ratio of Si/Al is not particularly limited. Preferably Si/Al ranges from 1:2 to 20:1 in atom ratio. Outside this range, durability is relatively poor.

The intermediate layer including types (1) and (2) mentioned above has a refractive index of from about 1.8 to about 3.0, preferably from 2.0 to 2.5 at a wavelength of 800 nm. An intermediate layer having a refractive index of less than 1.8 is rather low in Kerr rotational angle amplification, resulting in a reduced output. A refractive index of more than 3.0 results in a reduced output and an increased noise.

The intermediate layer may be formed by any desired one of gas phase film-forming techniques including sputtering, evaporation, ion plating, plasma CVD, and light CVD. Preferred techniques are multiple source sputtering using two or more targets of different compositions and reactive sputtering using oxygen.

It is desired to form the intermediate layer 26 by sputtering. The preferred target used in sputtering is a sintered mixture of a rare earth element oxide, preferably $La_2O_3$ and/or $CeO_2$, $SiO_2$ and $Si_3N_4$. The rare earth element oxide, especially $La_2O_3$ and/or $CeO_2$, can be partially or entirely replaced by the oxide of a pyrophoric alloy such as Auer metal, Huber metal, Misch metal, and Welsbach metal. The composition of these pyrophoric alloys is shown in Table 1.

TABLE 1

| Alloy designation | Component, % by weight | | | | | | | | | |
|---|---|---|---|---|---|---|---|---|---|---|
| | Fe | Zn | Ce | La | Y | Er | Mg | Sn | Pb | Cd |
| Auer metal | 35 | — | 35 | 24 | 4 | 2 | — | — | — | — |
| Huber metal | — | — | 85 | — | — | — | 15 | — | — | — |
| Misch metal | — | — | 40–60 | 20–40 | balance | — | — | — | — | — |
| Welsbach metal | 30 | — | 70 | — | — | — | — | — | — | — |
| Welsbach metal No. 1 | 30 | — | 60 | balance | | | — | — | — | — |
| Welsbach metal No. 1A | — | — | 57 | — | — | — | 3 | — | — | 40 |
| Welsbach metal No. 2 | — | — | 67 | — | — | — | 3 | 30 | — | — |
| Welsbach metal No. 3 | — | 30 | 67 | — | — | — | 3 | — | — | — |
| Welsbach metal No. 4 | — | — | 67 | — | — | — | 3 | — | 30 | — |

The intermediate layer may contain impurities such as argon which is introduced from the film-forming atmosphere. The nitrogen introduced from the film-forming atmosphere can be present as $N_2$ in the intermediate layer. In addition, such elements as Fe, Ni, Cr, Cu, Mn, Mg, Ca, Na, and K can be present as impurities.

The intermediate layer 26 has a thickness of from about 300 to about 3,000 Å, preferably from about 500 to about 2,000 Å. A thickness of less than 300 Å results in a reduced output and poor weatherability. Sensitivity and productivity are reduced with a thickness in excess of 3,000 Å.

The magneto-optical recording medium 10 of the present invention further includes an organic protective coating layer 20 on the upper protective layer 16 which is formed on the surface 17 of the magnetic thin-film layer 18 remote from the substrate.

The material of which the organic protective coating layer 20 is formed includes a variety of well-known organic materials. Preferably the organic protective coating layer 20 is a coating of a radiation-curable compound cured with radiation such as electron radiation and ultraviolet radiation.

Illustrative radiation-curable compounds include monomers, oligomers and polymers having contained or incorporated in their molecule groups capable of crosslinking or polymerizing upon exposure to radiation, for example, acrylic double bonds as given by acrylic and methacrylic acids having an unsaturated double bond capable of radical polymerization in response to an ionization energy and esters thereof, allyl double bonds as given by diallyl phthalate, and unsaturated bonds as given by maleic acid and maleic derivatives. The radiation-curable monomers used herein are those compounds having a molecular weight of less than 2,000 and the oligomers are those compounds having a molecular weight of 2,000 to 10,000.

The radiation-curable compounds having unsaturated double bonds which may be used as oligomers and monomers in the present invention include styrene, ethylacrylate, ethylene glycol diacrylate, ethylene glycol dimethacrylate, diethylene glycol diacrylate, diethylene glycol methacrylate, 1,6-hexaneglycol diacrylate, and 1,6-hexaneglycol dimethacrylate. More preferred are pentaerythritol tetraacrylate (and methacrylate), pentaerythritol triacrylate (and methacrylate), trimethylolpropane triacrylate (and methacrylate), trimethylolpropane diacylate (and methacrylate), polyfunctional oligoester acrylates (e.g., Aronix M-7100, M-5400, M-5500, M-5700, M-6250, M-6500, M-8030, M-8060, M-8100, etc., available from Toa Synthetic K.K.), acryl modified products of urethane elastomers (e.g., Nippolane 4040 available from Nippon Polyurethane K.K.), and the derivatives thereof having a functional group such as COOH incorporated therein, acrylates and methacrylates of phenol ethylene oxide adducts, compounds having a pentaerythritol fused ring represented by the following general formula and having an acryl or methacryl group or epsilon-caprolactone-acryl group attached thereto:

$$\left[\begin{array}{c}-OCH_2\\-OCH_2\end{array}\diagdown C \diagup \begin{array}{c}CH_2O\\CH_2OCH_2\end{array}\diagdown C\diagup \begin{array}{c}CH_2O-\\CH_2O-\end{array}\right]_m \left[\begin{array}{l}-(\overset{O}{\overset{\|}{C}}-CH_2CH_2CH_2CH_2CH_2O)_m\overset{O}{\overset{\|}{C}}-CH=CH_2]_a\\-(\overset{O}{\overset{\|}{C}}-CH=CH_2)_b\end{array}\right.$$

for example, compound wherein m=1, a=2, and b=4 (to be referred to as special pentaerythritol condensate A, hereinafter), compound wherein m=1, a=3, and b=3 (to be referred to as special pentaerythritol condensate B, hereinafter), compound wherein m=1, a=6, and b=0 (to be referred to as special pentaerythritol condensate C, hereinafter), and compound wherein m=2, a=6, and b=0 (to be referred to as special pentaerythritol condensate D, hereinafter), and special acrylates represented by the following general formulae:

$$(CH_2=CHCOOCH_2)_3-CCH_2OH \qquad (1)$$
(Special acrylate A)

$$(CH_2=CHCOOCH_2)_3-CCH_2CH_3 \qquad (2)$$
(Special acrylate B)

$$(CH_2=CHCO(OC_3H_6)_n-OCH_2)_3-CCH_2CH_3 \qquad (3)$$
(Special acrylate C)

$$CH_2=CHCO(OC_2H_4)_2-O-\underset{CH_2=CHCO(OC_2H_4)_2-O-}{\bigodot}-CH_2-SO_2-CH_2-\bigodot-O-(OC_2H_4)_2COCH=CH_2 \qquad (4)$$
(Special acrylate D)

(5)
Special acrylate E (bisphenol A type with CH₂=CHCO(OC₂H₄)₂—O— groups)

(6)
Special acrylate F (isocyanurate with HOCH₂CH₂—, CH₂CH₂COOCH=CH₂, CH₂CH₂COOCH=CH₂ substituents)

$$CH_3-(CH_2)_n-COOCH_2-\underset{\underset{CH_2COOCH=CH_2}{|}}{\overset{\overset{CH_2COOCH=CH_2}{|}}{C}}-CH_2OH \qquad (7)$$

(n ≈ 16)   (Special acrylate G)

$$CH_2=CHCOO-(CH_2CH_2O)_4-COCH=CH_2 \qquad (8)$$
(Special acrylate H)

(9)
Special acrylate I (isocyanurate with three CH₂CH₂COOCH=CH₂ groups)

-continued (Special acrylate J)

A: acrylic acid  X: polyhydric alcohol
Y: polybasic acid  (Special acrylate K)

$$A \!-\!\!(\!M\!-\!N\!)_{\overline{n}} M\!-\!A \quad (12)$$

A: acrylic acid  M: dihydric alcohol  N: dibasic acid
(Special acrylate L)

The radiation-curable oligomers include polyfunctional oligo-ester acrylates as represented by the following general formula:

wherein $R_1$ and $R_2$ are alkyl and n is an integer, and acryl-modified urethane elastomers, and derivatives thereof having such a functional group as COOH incorporated therein.

Also employable are radiation-curable resins which are prepared by modifying thermoplastic resins to be radiation sensitive.

Illustrative radiation-curable resins are thermoplastic resins having contained or incorporated in their molecule groups capable of crosslinking or polymerizing upon exposure to radiation, for example, acrylic double bonds as given by acrylic and methacrylic acids having an unsaturated double bond capable of radical polymerization and esters thereof, allyl double bonds as given by diallyl phthalate, and unsaturated bonds as given by maleic acid and maleic derivatives.

The thermoplastic resins which can be modified into radiation-curable resins include vinyl chloride copolymers, saturated polyester resins, polyvinyl alcohol resins, epoxy resins, phenoxy resins, cellulosic derivatives, etc.

Other examples of the resins which can be modified to be radiation curable include polyfunctional polyester resins, polyether ester resins, polyvinyl pyrrolidone resins and derivatives (e.g., PVP-olefin copolymers), polyamide resins, polyimide resins, phenol resins, spiroacetal resins, and acrylic resins comprising as a polymerization component at least one acryl or methacryl ester having a hydroxyl group.

The organic protective coating layer 20 of radiation-cured compound has a thickness of about 0.1 to 30 μm, preferably about 1 to 10 μm. Films of less than 0.1 μm thick are difficult to produce as a uniform film, less moisture proof in a highly humid atmosphere, and thus insufficient to improve the durability of the magnetic thin-film layer 18. Films in excess of 30 μm thick are practically unacceptable because their shrinkage during curing causes the recording medium to be warped and cracks to occur in the protective layer.

The protective layer may be formed by coating an appropriate composition by any well-known coating methods such as spinner coating, gravure coating, spray coating, and dipping. The conditions under which the film is coated may be suitably chosen by taking into account the viscosity of the polymer component in the composition, the substrate surface state, and the intended coating thickness.

These radiation-curable resins may be cured by any of various well-known methods using electron or ultraviolet radiation.

For electron radiation curing, a radiation accelerator is preferably operated at an accelerating voltage of 100 to 750 kV, more preferably 150 to 300 kV to generate radiation having a sufficient penetrating power such that the object is exposed to a radiation dose of 0.5 to 20 megarad.

When curing is effected with ultraviolet radiation, a photo polymerization sensitizer may be added to the radiation curable compounds as mentioned above.

The photo polymerization sensitizers used herein may be selected from well-known sensitizers. Examples of such sensitizers include benzoins such as benzoin methyl ether, benzoin ethyl ether, α-methylbenzoin, α-chlorodeoxybenzoin, etc.; ketones such as benzophenone, acetophenone, bis(dialkylamino)benzophenones; quinones such as anthraquinone and phenanthraquinone; and sulfides such as benzyl sulfide, tetramethylthiuram monosulfide, etc. The photo polymerization sensitizers may be added in amounts of 0.1 to 10% by weight based on the resin solids.

For exposure to ultraviolet radiation there may be used UV lamps such as xenon discharge lamps and hydrogen discharge lamps.

The optical recording medium 10 of the present invention further includes a protective plate 24 disposed on the organic protective coating layer 20 through an adhesive layer 22. More particularly, the protective plate 24 is used when the medium is of single side recording type wherein recording and reproducing operations are carried out only from the lower surface 13 of the substrate 12 which is free of a magnetic thin-film layer.

The protective plate 24 may be of a resinous material. Since the resinous material of the protective plate need not be transparent, a variety of resins may be used, for example, thermoplastic resins such as polyethylene, polyvinyl chloride, polystyrene, polypropylene, polyvinyl alcohol, methacrylic resin, polyamide, polyvinylidene chloride, polycarbonate, polyacetal, and fluoro resin; and thermosetting resins such as phenol resin, urea resin, unsaturated polyester resin, polyurethane, alkyd resin, melamine resin, epoxy resin, and silicone resin.

It is also possible to form the protective plate 24 from an inorganic material such as glass and ceramics. The shape and dimensions of the protective plate 24 are approximately the same as the substrate 12.

The protective plate 24 is bonded to the organic protective coating layer 20 through the adhesive layer 22. The adhesive layer 22 may be of a hot-melt resin adhesive and has a thickness of about 1 to 100 μm.

Instead of the protective plate 24, two sets of substrate 12, magnetic thin-film layer 18, protective layer 14/16, and organic protective coating layer 20 may be prepared and bonded with an adhesive layer such that the magnetic thin-film layers may be opposed to each other. This results in a double sided recording type medium wherein recording and reproducing operations can be carried out from the outside surfaces of both the substrates.

The lower surface 13 of the substrate 12 and the top surface of the protective plate 24 which is remote from the magnetic thin-film layer 18 are preferably covered with suitable protective coatings. Such coatings may be formed from the same material as previously described for the organic protective coating layer 20.

The magneto-optical recording medium of the present invention having a protective layer of a specific composition formed adjacent to the upper and/or lower surface of a recording layer is satisfactorily durable and resistant to corrosion. Recording/reproducing performance including recording sensitivity and C/N is maintained excellent.

EXAMPLES

In order that those skilled in the art will better understand the practice of the present invention, examples of the present invention are given below by way of illustration and not by way of limitation.

EXAMPLE 1

A magneto-optical recording disk having the structure as shown in FIG. 1 was prepared by molding a disk-shaped substrate 12 from a bisphenol-A polycarbonate of optical disk grade to a diameter of 13 cm and a thickness of 1.2 mm. A protective layer 14 of a vitreous material having the composition shown in Table 2 was formed on the substrate by sputtering. For all compositions, multiple source sputtering was employed. The proportion of components in the protective layer reported in Table 2 is calculated by the data of chemical analysis and the sputtering rate of each target (the oxides and nitrides indicated in the table heading). The letter "M" in Table 2 represents the total of all metals and metalloids in the layer such as Si plus M(II). The protective layer was 800 Å thick for all samples.

A magnetic thin-film layer 18 of Tb 21 at%-Fe 68 at%-Co 7 at%-Cr 4 at% alloy was formed on the protective layer 14 by sputtering to a thickness of 800 Å. The target used in sputtering was an iron (Fe) target having Tb, Co and Cr chips rested thereon.

Another protective layer 16 of vitreous material was formed on the magnetic thin-film layer 18. The composition and thickness of the upper protective layer 16 were the same as those of the lower protective layer 14.

The upper protective layer 16 was coated with a radiation-curable coating composition by spinner coating to form an organic protective coating layer 20. The coating composition contained 100 parts by weight of a multifunctional oligo-ester acrylate and 5 parts by weight of a light sensitizer. The coating of the composition was exposed to UV for 15 seconds into a cured film.

In this way, a series of samples were prepared as shown in Table 2. They were measured for the following properties.

(1) Durability

A thermal cycling test was carried out on a sample according to IEC-2-38 over a temperature range of from −10° C. to +65° C. at a relative humidity of 93%. This accelerated test was continued until the bit error rate reached twice the initial. The durability of the sample is expressed by the duration of the test continued. Under the conditions, spalling and cracking in the film largely contributed to an increase of bit error rate.

(2) Corrosion Resistance

A high-temperature, high-humidity aging test was carried out. That is, a sample was stored at 60° C. and 90% RH. This accelerated test was continued until the bit error rate reached twice the initial. The corrosion resistance of the sample is expressed by the duration of the test continued. Under the conditions, occurrence of pinholes largely contributed to an increase of bit error rate.

The results are shown in Table 2.

TABLE 2

| Sample No. | Protective Layer Composition | | | | | | Atomic ratio | | Durability (hr.) | Corrosion resistance (hr.) |
| --- | --- | --- | --- | --- | --- | --- | --- | --- | --- | --- |
| | Composition (wt %) | | | | | | | | | |
| | $SiO_2$ | $Si_3N_4$ | M(II)O | | $Al_2O_3/B_2O_3$ | AlN/BN | $M(I)_2O$ | Si/M | O/(O + N) | | |
| 101 | (38) | (20) | BaO (24) | CaO (18) | — | — | — | 0.7 | 0.73 | 1000 | 1500 |
| 102* | (69) | (31) | — | | — | — | — | — | 0.7 | 700 | 900 |
| 103 | (37) | (26) | BaO (23) | SrO (14) | — | — | — | 0.8 | 0.65 | 1000 | 1500 |
| 104* | (64) | (36) | — | | — | — | — | — | 0.65 | 700 | 900 |
| 105 | (19) | (39) | BaO (24) | SrO (18) | — | — | — | 0.8 | 0.43 | 900 | 1400 |
| 106 | (34) | (47) | BaO (14) | SrO (5) | — | — | — | 0.9 | 0.47 | 900 | 1300 |
| 107 | (30) | (35) | BaO (26) | ·SrO (9) | — | — | — | 0.8 | 0.54 | 1000 | 1500 |
| 108 | ·(21) | (29) | BaO (26) | SrO (10) | (9)/(5) | — | — | 0.6 | 0.63 | >1000 | >1500 |
| 109 | (20) | (21) | BaO (26) | SrO (10) | (17)/(6) | — | — | 0.5 | 0.72 | >1000 | >1500 |
| 110 | (20) | (14) | BaO (26) | SrO (10) | (17)/(6) | (7)/(—) | — | 0.4 | 0.74 | >1000 | >1500 |
| 111* | (39) | — | BaO (25) | SrO (9) | (16)/(11) | — | — | 0.4 | 1.0 | 600 | 1300 |
| 112 | (21) | (7) | BaO (27) | SrO (10) | (14)/(9) | (7)/(5) | — | 0.3 | 0.76 | 1000 | 1500 |

TABLE 2-continued

| Sample No. | Protective Layer Composition | | | | | | | | | Durability (hr.) | Corrosion resistance (hr.) |
|---|---|---|---|---|---|---|---|---|---|---|---|
| | Composition (wt %) | | | | | | | Atomic ratio | | | |
| | $SiO_2$ | $Si_3N_4$ | M(II)O | | $Al_2O_3/B_2O_3$ | AlN/BN | M(I)$_2$O | Si/M | O/(O + N) | | |
| | | | BaO | SrO | | | $Na_2O$ | | | | |
| 113 | (21) | (29) | (27) | (5) | (9)/(6) | — | (3) | 0.6 | 0.58 | 1000 | 1500 |

*comparison

EXAMPLE 2

A magneto-optical recording disk having the structure as shown in FIG. 2 was prepared by repeating substantially the same procedure as sample No. 101 of Example 1. The composition of the magnetic thin-film layer 18 was Tb 21 at%-Fe 72 at%-Co 7%. An intermediate layer 26 was formed between the magnetic thin-film layer 18 and the protective layer 14 by sputtering ZnS to a thickness of 800 Å. The resulting disk was designated sample No. 201.

Sample No. 201 was also tested for durability and corrosion resistance by the same procedures as described in Example 1. The results of sample No. 201 were nearly equivalent to those of sample No. 101.

EXAMPLE 3

A magneto-optical recording disk having the structure as shown in FIG. 1 was prepared by molding a disk-shaped substrate 12 from a bisphenol-A polycarbonate of optical disk grade to a diameter of 13 cm and a thickness of 1.2 mm. A protective layer 14 of a vitreous material having the composition shown in Table 3 was formed on the substrate by multiple source sputtering. Reactive multiple source sputtering was carried out in an atmosphere containing oxygen and nitrogen using targets of an oxide, a nitride, and at least one rare earth element (R) of yttrium, lanthanides and actinides. The proportion of components in the protective layer is calculated by the data of chemical analysis and the sputtering rate of each target(the oxides and nitrides indicated in the table heading). Auger spectroscopy was also carried out on the protective layer to determine R/M, Si/N, and O/(O+N). It is to be noted that "M" is the total of Si, divalent metal M(II), alkali metal M(I), Al and B, and "R" is the total of yttrium, lanthanides and actinides. The protective layer was 800 Å thick for all samples.

A magnetic thin-film layer 18 of Tb 25 at%-Fe 63 at%-Co 7 at%-Ti 5 at% alloy was formed on the protective layer 14 by sputtering to a thickness of 800 Å. The target used in sputtering was an iron (Fe) target having Tb, Co and Ti chips rested thereon.

Another protective layer 16 of vitreous material was formed on the magnetic thin-film layer 18 to a thickness of 800 Å. The composition of the upper protective layer 16 was the same as that of the lower protective layer 14 of sample No. 309 shown in Table 3.

The upper protective layer 16 was coated with a radiation-curable coating composition by spin coating to form an organic protective coating layer 20. The coating composition contained 100 parts by weight of a multi-functional oligo-ester acrylate and 5 parts by weight of a light sensitizer. The coating of the composition was exposed to UV for 15 seconds into a cured film.

In this way, a series of samples were prepared as shown in Table 3. They were measured for the following properties.

(1) Durability

A thermal cycling test was carried out on a sample according to IEC-2-38 over a temperature range of from −10° C. to +60° C. at a relative humidity of 90%. This accelerated test was continued until the burst error reached twice the initial. The durability of the sample is expressed by the duration of the test continued. Under the conditions, spalling and cracking in the film largely contributed to an increase of burst error.

(2) Corrosion Resistance

A high-temperature, high-humidity aging test was carried out. That is, a sample was stored at 80° C. and 80% RH. This accelerated test was continued until the burst error reached twice the initial. The corrosion resistance of the sample is expressed by the duration of the test continued. Under the conditions, occurrence of pinholes largely contributed to an increase of burst error.

(3) C/N

The C/N (carrier-to-noise ratio) of a sample expressed in dB was measured under the following conditions.
Rotating speed:4 m/sec.
Carrier frequency:1.0 MHz
Resolution:30 KHz
Video band width:100 Hz
Recording power:3–6 mW at 830 nm
Reproducing power:1 mW at 830 nm
The results are shown in Table 3.

TABLE 3

| Sample No. | Composition | | | | | | | | | | | Atomic ratio | | Durability (hr.) | Corrosion resistance (hr.) | C/N (dB) |
|---|---|---|---|---|---|---|---|---|---|---|---|---|---|---|---|---|
| | Protective Layer Composition | | | | | | | | | | | | | | | |
| | SiO₂ (wt %) | Si₃N₄ (wt %) | M(II)O (wt %) | | Al₂O₃/B₂O₃ (wt %) | AlN/BN (wt %) | M(I)₂O (wt %) | R | R/M | Si/M | O/(O + N) | | | | |
| | | | BaO | CaO | | | | | | | | | | | |
| 301* | (38) | (20) | (24) | (18) | — | — | — | Y | 0.06 | 0.7 | 0.73 | 700 | 850 | 47 |
| 302 | (20) | (21) | (26) | (10) | (17)/(6) | — | — | Y | 1.14 | 0.5 | 0.72 | >700 | >850 | 50 |
| 303 | (34) | (47) | (14) | (5) | — | — | — | Y | 1.14 | 0.90 | 0.47 | 700 | 800 | 48 |
| 304 | (39) | — | (25) | (9) | (16)/(11) | — | — | Y | 1.14 | 0.4 | 1.0 | 500 | 700 | 49 |
| 305 | (20) | (21) | (26) | (10) | (17)/(16) | — | — | Y | 2.70 | 0.5 | 0.72 | >700 | >850 | 42 |
| 306 | (20) | (21) | (26) | (10) | (17)/(16) | — | — | Y | 0.01 | 0.5 | 0.72 | 650 | 800 | 44 |
| 307 | (20) | (21) | (26) | (10) | (17)/(16) | — | — | Sm | 1.14 | 0.5 | 0.72 | >700 | >850 | 50 |
| 308 | (20) | (21) | (24) | (18) | (17)/(16) | — | — | Eu | 1.14* | 0.5 | 0.72 | >700 | >850 | 49 |
| 309 | (38) | (20) | (26) | (10) | — | — | — | — | — | 0.7 | 0.73 | 650 | 800 | 44 |
| 310 | (21) | (29) | (26) | (10) | (9)/(5) | — | — | Y + Eu | 0.60/0.54 | 0.6 | 0.63 | >700 | >850 | 50 |
| 311 | (20) | (14) | (26) | (10) | (17)/(6) | 7/— | — | Y + Eu + Sm | 0.4/0.32/0.32 | 0.4 | 0.74 | >700 | >850 | 49 |
| 312* | (69) | (31) | — | — | — | 7/5 | — | Y | 0.80 | 0.1 | 0.7 | 550 | 650 | 48 |
| 313 | (21) | (7) | (27) | (10) | (14)/(9) | — | 3 | Y | 0.80 | 0.28 | 0.76 | 650 | 800 | 47 |
| 314 | (21) | (29) | (27) | (5) | (9)/(6) | — | — | Y | 1.71 | 0.6 | 0.58 | 700 | 850 | 46 |
| 315 | (30) | (7) | (27) | (10) | (5)/(9) | 7/5 | — | Y | 1.00 | 0.4 | 0.76 | >700 | >850 | 48 |

*comparison

EXAMPLE 4

A magneto-optical recording disk having the structure as shown in FIG. 2 was prepared by molding a disk-shaped substrate 12 from a bisphenol-A polycarbonate of optical disk grade to a diameter of 13 cm and a thickness of 1.2 mm. A lower protective layer 14 having a thickness of 500 Å and an intermediate layer 26 having a thickness of 800 Å were formed by sputtering. For all compositions, multiple source sputtering was employed. The proportion of components in the protective and intermediate layers reported in Table 4 is calculated by the data of chemical analysis and the sputtering rate of each target (the oxides and nitrides indicated in the table heading). The letter "M" in Table 4 represents the total of all metals and metalloids in the layer such as Si plus M(II), and "MM" for sample No. 412 represents the oxide of Misch metal (MM) reported in Table 1. The refractive index of the intermediate layer at 800 nm is also reported in Table 4. The refractive index was changed by a choice of source composition and sputtering conditions including gas pressure and gas composition.

A magnetic thin-film layer 18 of Tb 21 at%-Fe 68 at%-Co 7 at%-Cr 4 at% alloy was formed on the intermediate layer 26 by sputtering to a thickness of 800 Å. The target used in sputtering was an iron (Fe) target having Tb, Co and Cr chips rested thereon.

An upper protective layer 16 of vitreous material was formed on the magnetic thin-film layer 18 to a thickness of 800 Å. The composition of the upper protective layer 16 was the same as that of the lower protective layer 14.

The protective layer 16 was coated with a radiation-curable coating composition by spinner coating to form an organic protective coating layer 20. The coating composition contained 100 parts by weight of a multi-functional oligo-ester acrylate and 5 parts by weight of a light sensitizer. The coating of the composition was exposed to UV for 15 seconds into a cured film.

In this way, a series of samples were prepared as shown in Table 4. These samples were measured for the following properties.

(1) Initial C/N

The initial C/N (carrier-to-noise ratio) of a sample expressed in dB was measured under the following conditions.

Rotating speed:4 m/sec.
Carrier frequency:1.0 MHz
Resolution:30 KHz
Recording power:3-6 mW at 830 nm
Reproducing power:1 mW at 830 nm

(2) Durability

A thermal cycling test was carried out on a sample according to IEC-2-38 over a temperature range of from $-10°$ C. to $+65°$ C. at a relative humidity of 93%. This accelerated test was continued until the bit error rate reached twice the initial. The durability of the sample is expressed by the duration of the test continued. Under the conditions, spalling and cracking in the film largely contributed to an increase of bit error rate.

(3) Corrosion Resistance

A high-temperature, high-humidity aging test was carried out. That is, a sample was stored at 70° C. and 90% RH. This accelerated test was continued until the bit error rate reached twice the initial. The corrosion resistance of the sample is expressed by the duration of the test continued. Under the conditions, occurrence of pinholes largely contributed to an increase of bit error rate.

The results are shown in Table 4.

TABLE 4

| Sample No. | Protective Layer Composition (wt %) | | | | | | Atomic ratio | | Intermediate Layer Composition (wt %) | | | Refractive index | C/N (dB) | Durability (hr.) | Corrosion resistance (hr.) |
|---|---|---|---|---|---|---|---|---|---|---|---|---|---|---|---|
| | SiO$_2$ | Si$_3$N$_4$ | M(II)O | Al$_2$O$_3$ B$_2$O$_3$ | AlN BN | M(I)$_2$O$_3$ | Si/M | O/(O + N) | SiO$_2$ | Si$_3$N$_4$ | others | | | | |
| 401 | 38 | 20 | 24 BaO 18 CaO | — | — | — | 0.7 | 0.73 | 5 | 80 | 10 AlN 5 Al$_2$O$_3$ | 2.4 | 57 | >1200 | >1500 |
| 402* | 69 | 31 | — | — | — | — | — | 0.7 | 5 | 80 | 10 AlN 5 Al$_2$O$_3$ | 2.4 | 57 | 1000 | 900 |
| 403 | 19 | 39 | 24 BaO 18 SrO | — | — | — | 0.8 | 0.43 | 5 | 80 | 10 AlN 5 Al$_2$O$_3$ | 2.4 | 57 | 1200 | 1500 |
| 404 | 34 | 47 | 14 BaO 5 CaO | — | — | — | 0.9 | 0.47 | 5 | 80 | 10 AlN 5 Al$_2$O$_3$ | 2.4 | 57 | 1200 | 1200 |
| 405 | 30 | 35 | 26 BaO 9 CaO | — | — | — | 0.8 | 0.54 | 5 | 80 | 10 AlN 5 Al$_2$O$_3$ | 2.4 | 57 | >1200 | >1500 |
| 406 | 21 | 29 | 26 BaO 10 CaO | 9/5 | — | — | 0.6 | 0.63 | 5 | 80 | 10 AlN 5 Al$_2$O$_3$ | 2.4 | 56 | >1200 | >1500 |
| 407 | 20 | 21 | 26 BaO 10 CaO | 17/6 | — | — | 0.5 | 0.72 | 5 | 80 | 10 AlN 5 Al$_2$O$_3$ | 2.4 | 56 | >1200 | >1500 |
| 408 | 20 | 21 | 26 BaO 10 CaO | 17/6 | — | — | 0.5 | 0.72 | 10 | 70 | 10 AlN 5 Al$_2$O$_3$ | 2.3 | 56 | >1200 | >1500 |
| 409 | 20 | 21 | 26 BaO 10 CaO | 17/6 | — | — | 0.5 | 0.72 | 20 | 60 | 15 AlN 20 La$_2$O$_3$ | 2.4 | 57 | >1200 | >1500 |
| 410 | 20 | 21 | 26 BaO 10 CaO | 17/6 | — | — | 0.5 | 0.72 | 30 | 60 | 10 La$_2$O$_3$ | 2.3 | 56 | >1200 | >1500 |
| 411 | 20 | 21 | 26 BaO 10 CaO | 17/6 | — | — | 0.5 | 0.72 | 10 | 60 | 30 CeO$_2$ | 2.3 | 56 | >1200 | >1500 |
| 412 | 20 | 21 | 26 BaO 10 CaO | 17/6 | — | — | 0.5 | 0.72 | 40 | 30 | 30 MM | 2.0 | 55 | >1200 | >1500 |
| 413 | 20 | 21 | 26 BaO 10 CaO | 17/6 | — | — | 0.5 | 0.72 | 100 | — | — | 1.6 | 47 | 1000 | 1000 |
| 414 | 20 | 21 | 26 BaO 10 CaO | 17/6 | — | — | 0.5 | 0.72 | — | 100 | — | 2.2 | 53 | 900 | 1000 |
| 415 | 20 | 21 | 26 BaO 10 CaO | 17/6 | — | — | 0.5 | 0.72 | 20 | 80 | — | 2.0 | 52 | 1100 | 1000 |
| 416 | 20 | 21 | 26 BaO 10 CaO | 17/6 | — | — | 0.5 | 0.72 | — | — | — | — | 47 | 1100 | 900 |
| 417 | 20 | 21 | 26 BaO 10 CaO | 17/6 | 7/0 | — | 0.4 | 0.74 | 5 | 80 | 5 Al$_2$O$_3$ 10 AlN | 2.4 | 56 | >1200 | >1500 |
| 418* | 39 | 14 | 25 BaO 9 CaO | 16/11 | — | — | 0.4 | 1.0 | 5 | 80 | 5 Al$_2$O$_3$ 10 AlN | 2.4 | 55 | 800 | 1000 |
| 419 | 21 | 7 | 27 BaO 10 CaO | 14/9 | 7/5 | — | 0.3 | 0.76 | 5 | 80 | 5 Al$_2$O$_3$ 10 AlN | 2.4 | 56 | >1200 | >1500 |
| 420 | 21 | 29 | 27 BaO 5 CaO | 9/6 | — | 3Na$_2$O | 0.6 | 0.58 | 5 | 80 | 5 Al$_2$O$_3$ 10 AlN | 2.4 | 56 | >1200 | 1400 |
| 421* | — | — | — | — | — | — | — | — | 5 | 80 | 5 Al$_2$O$_3$ 10 AlN | 2.4 | 56 | 900 | 800 |
| 422* | — | — | — | — | — | — | — | — | 20 | 80 | — | 2.0 | 51 | 900 | 600 |

*comparison

The results of Examples 1 to 4 show the effectiveness of the present invention.

Similar results were obtained with phase conversion type recording layers of Te-Ge, TeO$_x$, and Te-Se.

Obviously, numerous modifications and variations of the present invention are possible in light of the above teachings. It is therefore to be understood that within the scope of the appended claims, the invention may be practiced otherwise than as specifically described herein.

I claim:

1. A magneto-optical recording medium comprising:
   a substrate,
   a recording layer formed on the substrate, said recording layer having upper and lower surfaces disposed remote from and adjacent to the substrate, respectively, and
   at least one protective layer formed adjacent to the upper or lower surface of said recording layer, said protective layer comprising silicon, at least one divalent metal selected from the group consisting of barium, calcium, magnesium and strontium, oxygen, and nitrogen wherein the silicon is present in the protective layer in an atomic ratio of silicon to the total of silicon and divalent metal of from about 3:10 to about 9:10, wherein the oxygen is present in the protective layer in an atomic ratio of oxygen to the total of oxygen and nitrogen of from about 4:10 to about 8:10.

2. The magneto-optical recording medium of claim 1, wherein the protective layer composition further contains at least one member selected from the group consisting of aluminum and boron.

3. The magneto-optical recording medium of claim 2, wherein said member is present in an atomic ratio of said member to silicon of up to 1:1.

4. The magneto-optical recording medium of claim 2, wherein the protective layer composition further contains at least one rare earth element selected from the group consisting of yttrium, lanthanide and actinide.

5. The magneto-optical recording medium of claim 4, wherein the rare earth element is present in an amount of about 2 to 250 atom % based on the total of silicon and divalent metal.

6. The magneto-optical recording medium of claim 1, wherein the protective layer is disposed between the substrate and the recording layer.

7. The magneto-optical recording medium of claim 1, comprising two protective layers wherein one protective layer is disposed adjacent to the upper surface of the recording layer and the other protective layer is disposed adjacent to the lower surface of the recording layer.

8. The magneto-optical recording medium of claim 1, which further comprises an intermediate layer formed contiguous to the lower surface of said recording layer from at least one member selected from the group consisting of an oxide, carbide, nitride and sulfide.

9. The magneto-optical recording medium of claim 1 which further comprises an intermediate layer formed contiguous to the lower surface of said recording layer and containing silicon, at least one metal or metalloid other than silicon, oxygen, and nitrogen.

10. The magneto-optical recording medium of claim 9, wherein the metal or metalloid in the intermediate layer is a rare earth element.

11. The magneto-optical recording medium of claim 9, wherein the the metal or metalloid in the intermediate layer is an aluminum.

* * * * *